No. 658,718. Patented Sept. 25, 1900.
J. A. CARDINELL.
SPEED MECHANISM FOR BICYCLES.
(Application filed Sept. 26, 1898.)
(No Model.)
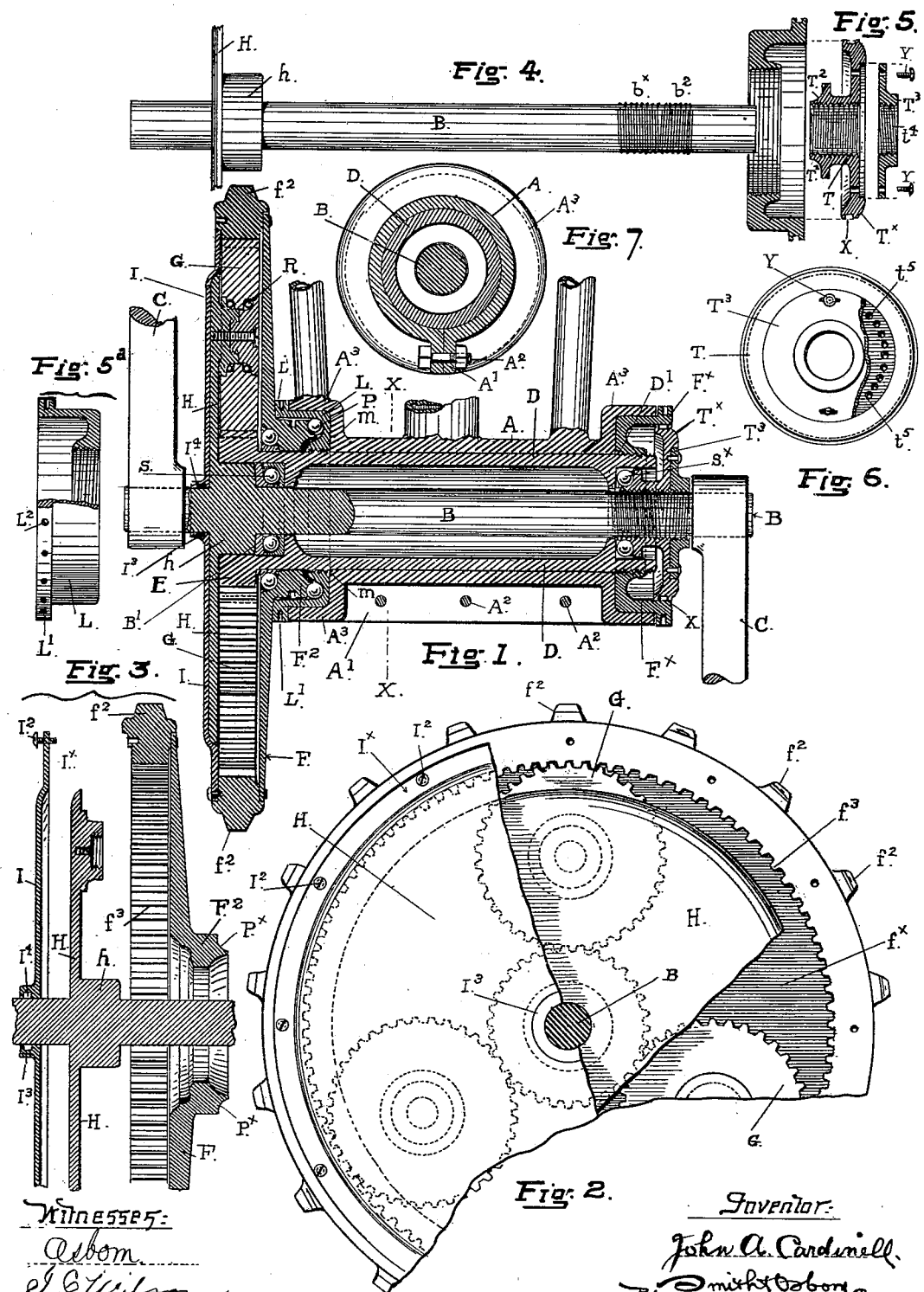

UNITED STATES PATENT OFFICE.

JOHN A. CARDINELL, OF SAN FRANCISCO, CALIFORNIA.

SPEED MECHANISM FOR BICYCLES.

SPECIFICATION forming part of Letters Patent No. 658,718, dated September 25, 1900.

Application filed September 26, 1898. Serial No. 691,848. (No model.)

*To all whom it may concern:*

Be it known that I, JOHN A. CARDINELL, a citizen of the United States of America, residing in the city and county of San Francisco and State of California, have invented certain new and useful Improvements in Speed Mechanism for Bicycles, of which the following is a specification.

This invention relates to improvements made in driving mechanism connecting the power-actuated shaft of a bicycle or similar vehicle with the axle of the wheel to be propelled; and the improvements consist in certain novel constructions of speed-gearing and parts connecting the crank-shaft or driving-shaft with the sprocket-wheel of the mechanism by which an accelerated motion of the sprocket-wheel or driver over the driving-shaft is produced and also in certain novel constructions and combinations of parts producing an improved bearing for the crank-shaft in which the parts are readily tightened and adjusted to take up wear and loose movement and the bearings made dust-proof.

The following description explains the nature of my said improvements and the manner in which I proceed to construct, produce, and apply the same for operation, reference being had to the drawings that accompany and form part of this specification.

Figure 1 of the drawings is a front view in elevation of a driving mechanism and bearings for the pedal-shaft of a bicycle, the parts being shown generally in longitudinal section. Fig. 2 is a front view of the sprocket-wheel and gears connecting it and the pedal-shaft or driving-shaft together, parts of the wheel being broken away to expose the gears. Fig. 3 is a vertical cross-section through the sprocket-wheel and parts, with the gears omitted and the parts separated. Fig. 4 is a detail view of the driving-shaft. Fig. 5 is a sectional view of the parts of the shaft-bearing on the right-hand side of Fig. 1. Fig. 5$^a$ is a cross-section of the cup-shaped nut of the bearings. Fig. 6 is a front view of the adjusting-nut shown in Fig. 5 with the check-nut broken away. Fig. 7 is a cross-section at $x\ x$, Fig. 1.

In the several figures which illustrate my said improvements applied to a bicycle of ordinary construction, A indicates the tubular yoke of the frame, B the pedal-shaft, and C the cranks, fixed on its ends outside the yoke A, in which the shaft has bearing.

D is a long sleeve fixed in the yoke around the shaft, so that it cannot turn with the shaft, and E is a spur-gear on the end of that sleeve. The yoke A is made with a split joint A′, drawn up by bolts A², and the sleeve is clamped and held in a fixed position after being inserted in the yoke by tightening the screws.

F is a sprocket-wheel having on one side a deep recess $f^\times$ to contain a set of spur-gears G G G, and H is a disk or circular plate fixed on the shaft B by a hub $h$ against the open side of the wheel F and carrying the studs and bearings of the gears G. A dished plate I, covering this disk H, is secured to the sprocket-wheel by an annular flange I$^\times$ and screws I² in such manner as to produce a tight joint between the two parts and inclose the gears and their carrying-plate. A dust-proof joint is formed around the shaft where it passes through this cover by a hub I³, having a packing-ring I⁴ set in a groove.

On the rim of the sprocket-wheel are the usual spurs or sprockets $f^2$, and on the inside a circle of internal gear-teeth $f^3$ all around the inner circumference.

The sprocket-wheel is mounted on the fixed sleeve D to turn independently of the shaft B and the construction of its bearings is as follows: On the back or inner face of the sprocket-wheel is a hub F², surrounding the sleeve D at that end and fitted to turn smoothly on the sleeve and within a cup-shaped nut L, that is secured on the sleeve by a threaded portion $m$. The cup-shaped nut surrounding the hub F² has a close-working fit within the enlarged end A³ of the tubular yoke and is provided with a flanged rim L′, in which are holes or notches L² to take a spanner for turning the nut, for which purpose the edge of the flanged rim extends outward between the back of the sprocket-wheel and the end of the yoke. Between the hub F² and this nut, as well as between the hub and the stationary sleeve D, ball-bearings P P are interposed to reduce friction, the hub having suitable grooves P$^\times$ P$^\times$ for that purpose. Ball-bearings R R are placed also in the hubs of the spur-gears G, the bearings being constructed in two parts for that purpose, as shown in Fig. 1 of the drawings.

As before described, the sleeve D, carrying the spur-gear E, is stationary in the yoke, while the shaft B rotates in it, and consequently the sprocket-wheel, turning on the outside of the sleeve, is only connected to the driving-shaft B by the gears G G and the internal gear-teeth of the sprocket-wheel. The gears G, meshing with the gear on the stationary sleeve and with the circle of teeth in the recess of the sprocket-wheel, are set at points around the circle equidistant from one another and are so proportioned that the sprocket-wheel F has an accelerated motion given to it that causes it to constantly gain in speed over the driving-shaft B.

Between the sleeve D and the driving-shaft are placed ball-bearings S $S^\times$ at both ends of the yoke. Those at the sprocket-wheel end are located in line with the bearings between the hub $F^2$ of the sprocket-wheel and the sleeve, as seen in Fig. 1 of the drawings. A collar B' on the driving-shaft just inside hub $h$ forms a shoulder for the ball-bearing S. This shoulder is drawn up against the balls by means of the nuts T $T^3$ on the opposite end of the shaft.

The shaft-bearing at the end opposite to the sprocket-wheel is constructed with a view to readily taking up loose play resulting from wear of the parts and to maintain a close but smoothly-working bearing at both ends. The parts of the bearing are shown in Figs. 1 and 5.

T is the bearing-nut working on a right-hand screw-thread $b^\times$ on the shaft, formed with a flanged head $T^\times$ and a boss T', having a groove or seat $T^2$ on the inner end for the balls $S^\times$.

$T^3$ is a check-nut having a threaded portion $t^4$, working on a left-hand screw-thread $b^2$ on the shaft, and a flanged head with a flat back or inner face that is finished to fit tightly against or into a cavity within the flanged head of the nut T. In the head of this last-mentioned part is a circle of spaced holes $t^5$, tapped for screws Y, by which the two parts $T^\times T^3$ are fastened together after they are screwed up. The screws take through elongated holes (see Fig. 6) in the flange $T^3$, so as to permit adjustment of the screws in line with the hole in the head of the nut behind it. When the nut T is screwed up in place, it presses and holds the balls $S^\times$ up to a seat and bearing against the shoulder D' on the inside of the sleeve D, and as the parts become loose under wear the nut T is screwed up against the balls by taking out the screws Y and loosening the check-nut $T^3$. The rim of the flanged head of the nut T is fitted to turn smoothly and easily within a cup-shaped nut $F^\times$, seated within the enlarged end $A^3$ of the yoke and screwed onto the end of the sleeve D, and a packing-ring is set in a groove X in the rim to produce a dust and dirt proof joint. By means of these parts and fittings all loose motion due to wear, both in the sprocket-wheel end and the opposite end, is readily taken up and the bearings properly tightened without removing any of the parts.

Having thus fully described my invention, what I claim therein as new, and desire to secure by Letters Patent, is—

1. The combination, with a tubular yoke, of the stationary sleeve fixed in said yoke, spur-gear on said sleeve, sprocket-wheel F having a hub fitted to turn on the sleeve, a flanged rim and internal gear-teeth on the inner face of said rim, the driving-shaft having the circular plate fast thereon, the spur-gears mounted on studs on said plate and arranged around the shaft to mesh with the stationary center gear and with the circle of internal gear-teeth in the sprocket-wheel, the covering-plate secured to the rim of the sprocket-wheel and having a hub fitting around the shaft, the cup-shaped nut L, and the ball-bearings between the shaft and the sleeve, and between the sprocket-wheel hub and the cup-shaped nut, substantially as described.

2. The combination with the stationary yoke having an enlarged end, the sleeve fixed in the yoke and exteriorly threaded within the enlargement, and a cup-shaped nut screwed onto the sleeve, fitting within the enlargement, and having a flanged rim standing at the end of the yoke and provided with radial holes; of the crank-shaft, the sprocket-wheel having a hub within the nut, ball-bearings between this hub and nut and between the hub and sleeve, and connections between the wheel and shaft, substantially as described.

In testimony that I claim the foregoing I have hereunto set my hand and seal.

JOHN A. CARDINELL. [L. S.]

Witnesses:
L. OSBORN,
EDWARD E. OSBORN.